United States Patent [19]

Schüster

[11] 4,217,213

[45] Aug. 12, 1980

[54] DEVICE FOR THE SEPARATION OF MINUTE MAGNETIZABLE PARTICLES, METHOD AND APPARATUS

[75] Inventor: Karl Schüster, Erlangen, Fed. Rep. of Germany

[73] Assignee: Siemens Aktiengesellschaft, Berlin and Munich, Fed. Rep. of Germany

[21] Appl. No.: 933,534

[22] Filed: Aug. 14, 1978

[30] Foreign Application Priority Data

Aug. 26, 1977 [DE] Fed. Rep. of Germany ....... 2738649
Sep. 26, 1977 [DE] Fed. Rep. of Germany ....... 2743213

[51] Int. Cl.$^2$ .............................................. B01D 35/06

[52] U.S. Cl. .................................... 210/42 S; 55/100; 210/223

[58] Field of Search .................. 55/100; 210/222, 223, 210/42

[56] References Cited

U.S. PATENT DOCUMENTS

| | | | |
|---|---|---|---|
| 3,277,631 | 10/1966 | Sunnen | 55/100 |
| 3,380,589 | 4/1968 | Grey | 55/100 |
| 3,489,280 | 1/1970 | Israelson et al. | 210/222 X |
| 3,567,026 | 3/1971 | Kolm | 210/222 |
| 3,608,718 | 9/1971 | Aubrey, Jr. | 55/100 |
| 3,722,677 | 3/1973 | Lehnert | 55/100 |
| 3,873,448 | 3/1975 | Isberg | 210/222 |
| 3,887,457 | 6/1975 | Malsem et al. | 210/222 |
| 3,929,433 | 12/1975 | Lucero | 55/100 |
| 3,988,240 | 10/1976 | Flaas | 210/222 |
| 4,078,998 | 3/1978 | Oder et al. | 210/222 |
| 4,090,855 | 5/1978 | Hold et al. | 55/100 |
| 4,116,839 | 9/1978 | Unkelbach et al. | 210/222 |

*Primary Examiner*—Theodore A. Granger
*Attorney, Agent, or Firm*—Kenyon & Kenyon

[57] ABSTRACT

A device for filtering systems for the separation of minute magnetizable particles down to particle sizes below 1 μm from a gaseous or liquid medium introduced into a working volume permeated by a magnetic field in which the working volume is located in a rotating magnetic field and, in some embodiments, an agitated filter structure is disposed in the working volume to cause relatively large magnetic structures to be developed from the minute individual particles in a relatively weak rotating field, which structures can then be filtered out at a relatively high separating rate.

22 Claims, 9 Drawing Figures

DEVICE FOR THE SEPARATION OF MINUTE MAGNETIZABLE PARTICLES, METHOD AND APPARATUS

BACKGROUND OF THE INVENTION

This invention relates to a device for filtering systems for the separation of minute magnetizable particles down to particle sizes below 1 μm from a gaseous or liquid medium introduced into a working volume permeated by a magnetic field and to a method for the operation of this device.

Magnetic filtering systems make use of the fact that a magnetizable particle in a suitable magnetic field is subjected to a force which moves or retains it against other forces acting upon it, such as gravity or the hydrodynamic friction forces acting on it in a liquid medium. Separating methods according to this principle can be applied, for example, to steam or cooling water loops in both conventional and nuclear power plants. For in the liquid or gaseous medium of these loops minute particles which have generally developed through corrosion are suspended. These particles are ferromagnetic, such as magnetite ($Fe_3O_4$), partly antiferromagnetic, such as hematite ($\alpha$—$Fe_2O_3$), or paramagnetic like copper oxide (CuO). Accordingly, these particles which, in addition, occur in various particle sizes, are magnetizable to different degrees.

Large and/or strongly magnetic, i.e. ferromagnetic, particles can be separated by magnetic ball filters, for instance. Filtering equipment suitable for this purpose is known from the U.S. Pat. No. 3,539,509 and contains a cylindrical filter tank filled with soft iron balls which are disposed in a constant magnetic field generated by an electric coil surrounding the filter tank. The field strength gradients obtained through this magnetic field, in conjunction with the balls, are high enough to cause the ferromagnetic particles transported by a liquid flowing through the filter to accumulate at the magnetic poles of the balls. To clean this filter, the balls can be demagnetized.

However, minute ferromagnetic particles of a diameter in the order of magnitude of 1 μm, or also weakly magnetic, i.e. antiferromagnetic or paramagnetic particles, can hardly be separated by this known device because the magnetic field gradients brought about at the soft iron balls are insufficient therefor. Therefore, the separating rate of this filtering device is too poor for these types of particles. The separating rate is understood to be the difference 1-p, p being the permeability of the filter structure. This permeability is defined as the ratio of the concentration of suspended substances still present in the medium after passing through the filter structure to the corresponding concentration prior to entering the filter structure.

A filtering device for the separation of such minute ferromagnetic or also paramagnetic particles is known from the U.S. Pat. No. 3,567,026. This filtering device contains a filter structure of ferromagnetic, noncorroding steel wool, disposed in a constant, strong magnetic field, the magnetic flux density of which, in the filter volume, is at least 1.2 Tesla. This technique is known as the high-gradient magnetic separation technique. In order to obtain a relatively high separating rate with such a magnetic filter, the steel wool wires must be very thin, on the one hand. For, the magnetic field gradients then produced at their surfaces are correspondingly great. On the other hand, however, the flow channels formed between the wires must also be large enough to prevent their clogging with separated material and to prevent the filter's flow resistance and the pressure drop brought about thereby from becoming too great. But, a steel wool for this magnetic filter which will meet these requirements is relatively difficult to produce. Moreover, a relatively high separating rate is attainable with this known magnetic filter only if a correspondingly large filter volume is available. The magnet coils for the generation of the high magnetic fields required must be of correspondingly large size. Therefore, only superconducting magnets can generally be used in the known filtering device.

SUMMARY OF THE INVENTION

It is an object of the present invention to improve the known filtering devices for the separation of minute ferromagnetic or weakly magnetizable particles of a particle size down to below 1 μm towards the end of further increasing their separating rate without requiring correspondingly greater magnetic field gradients of the known filtering devices.

According to the invention, this problem is solved, for a device of the kind described at the outset, by disposing the working volume in a rotating magnetic field.

The invention starts from the knowledge that moving, magnetizable particles attract each other in a magnetic field and arrange themselves in a chain-like structure in the direction of the magnetic field. The chains thus formed can assume many times the size of the original particles. For instance, by bringing an $Fe_3O_4$ water solution with minute magnetic particles a few μm or less in size into a constant magnetic field, innumerable very fine threads about 50 to 100 μm long will form, drifting slowly in the field direction. Now, if a rotating magnetic field instead of a constant field is provided according to the present invention, these fine threads will rotate at the rotating field frequency and form compact, elongated structures of diameters amounting to a multiple of the original particle size due to several threads and particles in the immediate vicinity of each other combining. These structures, rotating about their center of gravity, migrate very slowly through the working volume permeated by the rotary field on account of random collisions. Due to the rotary motion virtually all of the minute magnetizable particles in the immediate vicinity of these structures are captured and accumulate to form a single structure.

The magnetic field strength of the rotating field in the working volume can be relatively low, such as in the order of magnitude of 0.1 Tesla. Therefore, the rotating field may be generated by a magnetic device corresponding to the stator winding of a three phase motor.

Accordingly, the advantages of the device according to the present invention are, in particular, that the relatively large magnetic structures developed from individual particles in a relatively weak rotating field can now be filtered out by means of a known filtering device at a correspondingly greater separating rate. Such a filtering device may be arranged downstream of the working volume, for instance.

But, advantageously, a filter structure of the filtering system of the present invention may also be disposed in the working volume itself. The type of structure used in magnetic filters using the high gradient magnetic separating technique may be provided as filter structure. The advantages of such an arrangement are, in particular, that, in contrast to the known filters, only relatively small magnetic field strengths, and/or filter structures made of wires not suited for the original particle size, i.e. relatively thich wires, are required for a separation of minute magnetizable particles at a high separating rate. Furthermore, in contrast to the known filtering systems with constant magnetic fields, special demagnetization of the filter structure to clean it is unnecessary.

According to a further development of this device with a filter structure in its working volume it is particularly advantageous to provide an agitated filter structure within the working volume.

Through the use of a filter structure motion only large enough that the friction forces acting upon the particles suspended in the medium are smaller than the forces tending to accumulate them on the filter structure, it is possible to increase the probability that a suspended particle is brought closer to the filter structure than if the filter structure were not moving. The rate of separation on the filter structure can be increased in this manner.

A particularly simple embodiment of this device comprises a filter structure made of a wire net which is loosely wound around the axis of rotation of the rotating magnetic field or around an axis parallel thereto. The parts of the net then perform a motion oscillating with the rotating field frequency, due to which very weakly magnetic, minute particles such as of copper oxide or of $\alpha$-$Fe_2O_3$ are also filtered out of the medium at a great separating rate despite the relatively weak field strength of the rotating field.

Particularly high separating rates can be obtained by providing a filter structure corotating with the rotating field.

Furthermore, an agitated filter structure can advantageously be constructed in simple manner from individual particles of ferromagnetic material accumulating in the direction of the field lines of the rotating magnetic field. For these particles will then rotate, either singly or in clusters, forming larger structures, about their center of gravity axis with the rotating field frequency so that, with a flow velocity of the medium which is not too large, the probability of the particles suspended in the medium reaching the immediate vicinity of these particles and thus coming into zones of high magnetic field gradients is relatively great.

DETAILED DESCRIPTION OF THE INVENTION

Figure 1:
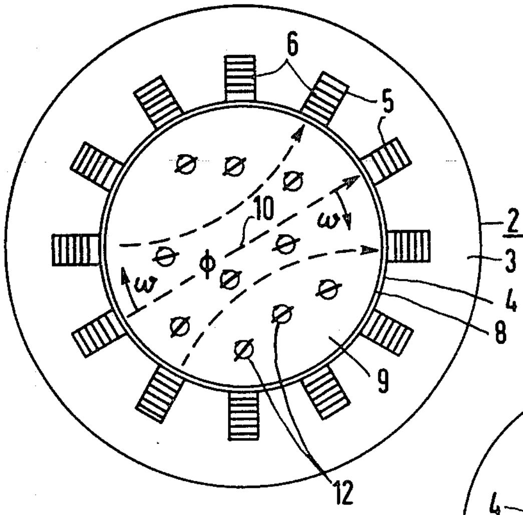
FIG. 1 is a schematic illustration of a device according to the present invention.

The device according to FIG. 1 is generally arranged so that its transverse section shown in FIG. 1 lies in a horizontal plane. The device comprises a stator 2 of a rotary field machine consisting of a cylindrical stack of laminations 3 in which a central bore 4 is provided. On the inside of this stack of laminations, thus being of annular shape, is provided a predetermined number of slots 5 in which a three phase winding 6 is inserted. The bore 4 is penetrated by a tubular part 8 of nonmagnetic material whose interior, surrounded by the winding, represents a working volume 9. Now, if a three phase current is fed to the winding 6 disposed in the stator, it generates a rotating field $\phi$, whose field lines are indicated by three dashed lines with arrows in the central working volume 9. This rotating field rotates about a central axis 10 of the device at an angular velocity $\omega$ and is oriented essentially radially relative to this axis. The applicable angular velocity is $\omega=2\pi\times f/p$, f being the frequency of the three phase current and p the number of pole pairs of the stator winding 6.

A gaseous or liquid medium in which minute, magnetizable particles are suspended is fed into the cylindrical working volume 9. Such particles are, for example, magnetic particles of particle sizes down to below 1 $\mu m$ or also minute hematite or CuO particles. The rotating magnetic field $\phi$, brought about by the stator winding 6, the magnetic induction of which in the working volume 9 amounts to, say, only about 0.1 Tesla, permeates the suspension over the entire axial length of the stator winding. This causes innumerable structures composed of these magnetizable particles to develop and distribute evenly throughout the entire working volume 9. Only a few of these, which may be one hundred times the size of the individual particles, for instance, are indicated (enlarged over actual size) and marked 12. These structures rotate about their center of gravity in the rotating field $\phi$. Due to this rotation, the immediate vicinity of such a structure is largely cleaned of these finest particles. Accidental collisions cause the structures 12 to travel only slowly through the working volume 9.

Figure 2:
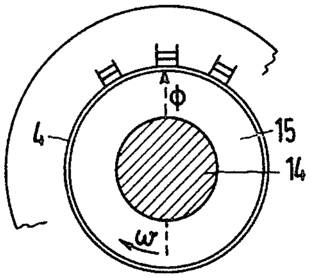
FIG. 2 shows another such device of special design.

FIG. 2 shows a partial transverse section of a device essentially corresponding to the device according to FIG. 1. But inserted in its hollow cylindrical working volume, concentric to the axis 10 of the device, is a cylinder 14 of a magnetic material. Thus a working volume 15 of annular shape in transverse section, permeated by the rotating field $\phi$, is created. In this manner it is possible to obtain a greater magnetic induction in the working volume 15 and thus a further enlargement of the structures composed of the individual particles than is possible with the device according to FIG. 1.

Figure 3:
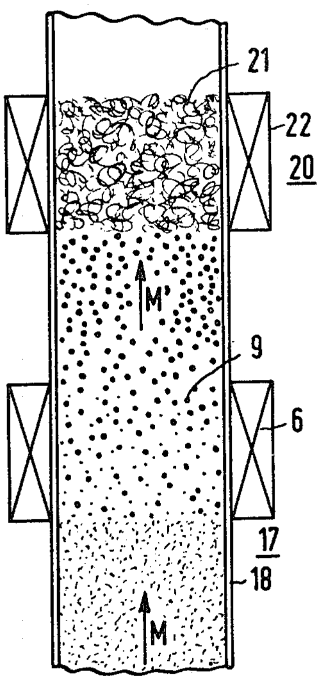
FIGS. 3 and 4 illustrate two different applications of the device according to the present invention.

In the devices according to FIGS. 1 and 2, it is possible to separate, by sedimentation, the relatively large magnetizable structures 12 having developed therein after shutting off the rotating field. In addition, a device according to the present invention may also be followed by a known filtering system by which these particle structures are filtered out of the medium. Such an arrangement is schematically indicated in FIG. 3 as a longitudinal section. A device marked 17, such as one corresponding to the device according to FIG. 1, contains a working volume 9 into which a medium M including the particles to be separated is introduced through a pipeline 18. The particles are indicated by individual dots, and the flow direction of the medium by an arrow. Due to the fact that the working volume 9 is permeated by a rotating field brought about by a field winding 6, the particles suspended in the medium M accumulate in the rotating field, forming larger magnetizable structures. These magnetizable particle structures are depicted as larger dots than those indicating the particles suspended in the medium M, while the medium which carries these particle structures with it and discharges from the working volume is marked M'. It is fed into a known filtering system 20 adjoining the device 17. This filtering system is, for instance, a filter of the so-called high gradient magnetic separation type, which generally contains a filter structure 21 constructed of fine wires of ferromagnetic material. The filter structure is located within a strong, constant magnetic field set up by a magnet coil 22 which surrounds the filter structure concentrically. But, structureless magnetic constant field filters may also be used instead of such a filter 20 with a filter structure 21 for the removal of the relatively large magnetizable structures.

Figure 4:
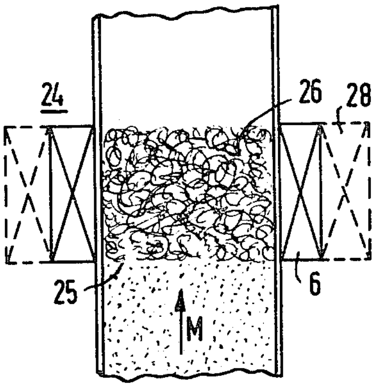

Besides one arrangement of a device according to the present invention as shown in FIG. 3, where a filtering system must follow downstream, the device of the present invention may also be combined directly with a filtering system. Such an embodiment is schematically indicated in FIG. 4 in longitudinal section. The device 24 contains in its working volume 25 a filter structure 26 constructed of fine wires of ferromagnetic material. Appropriate filter structures consist, for example, of steel wool or contain a multiplicity of individual nets arranged one behind the other in the flow direction of medium M. A rotating field winding 6 is concentrically arranged around the working volume 25. Thus, with this device according to the present invention, which is combined with a filter, the particles suspended in the medium M are not only pulled together into larger magnetizable particle structures, but these particle structures are also magnetically filtered out of the medium at the same time.

If applicable, there may be provided, in those embodiments of devices according to the present invention whose working volume includes a fixed ferromagnetic filter structure therein, an additional constant field magnet system besides the rotating field winding 6 indicated in FIG. 4, by means of which large magnetic field gradients are produced in the filter structure. Such an additional magnet unit 28, indicated by broken lines in FIG. 4, may surround the rotating field winding 6 concentrically, for instance. But it is also possible to place the constant field winding 28 around the working volume 25 with the filter structure 26 first and mount the rotating field winding 6 to the outside of this winding. The rotating field of the rotating field winding is thus superimposed on the constant field of this magnet system. Such a device makes it possible, in particular, to still filter very weakly magnetizable particles out of a medium at a high separating rate.

Figure 5:
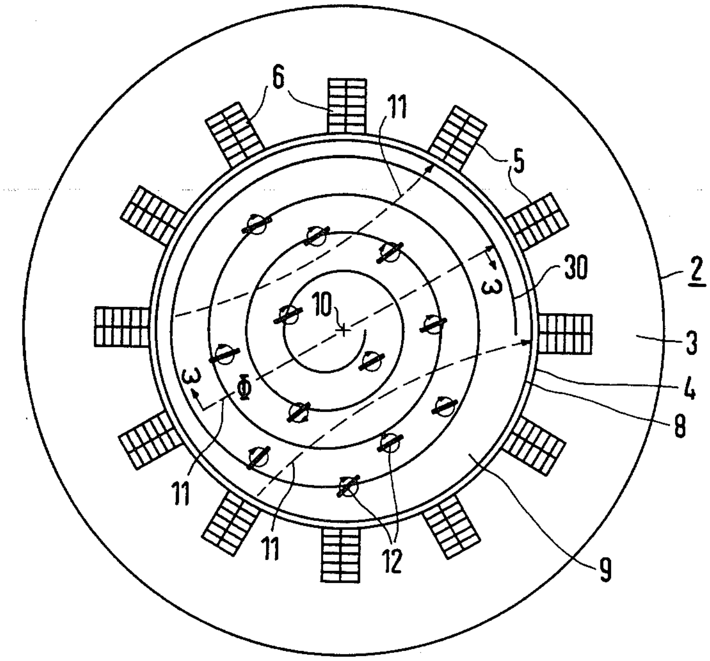
FIGS. 5 to 9 depict four different embodiments of devices according to the present invention with agitated filter structures.

Shown in FIG. 5 as transverse section is another device for the separation of minute magnetizable particles, in essence corresponding to the embodiment according to FIG. 1. Therefore, identical components are marked accordingly. The embodiment shown in FIG. 5 differs from that according to FIG. 1, among other factors, in that its working volume 9 is almost completely filled out by a roll of netting 30 wound helically and loosely around the axis 10. This roll of netting represents a filter of the high gradient magnetic separation type, for instance, which consists of fine wires of ferromagnetic material. In this device, therefore, the particles in the working volume 9 not only accumulate to form relatively large structures 12, but the particle structures developed in this volume are at the same time filtered out of the medium flowing through it by means of the nets. Since the roll of netting 30 is wound more or less loosely, under the force of the medium's flow velocity, its net components perform a motion oscillating with the rotating frequency f of the magnetic field. Due to this oscillating motion it is possible to filter out, at a relatively high separating rate, even very weakly magnetic, minute particles such as of CuO or of $\alpha$-$Fe_2O_3$, although the rotary field $\phi$ produced by the rotary field winding 6 in the working volume has a relatively low magnetic induction of, say, 0.1 Tesla.

In one specific embodiment of this device, the roll of netting 30 wound loosely and helically around the axis 10 consisted of chromium steel. Its wires had a diameter of 0.067 mm and its mesh width was 0.14 mm. In a rotating field of 0.1 Tesla it was then possible to filter out more than 90% of the CuO particles after a one minute filtering time. For $\alpha$-$Fe_2O_3$ particles, such a separating rate is already reached with this device after 10 seconds. $Fe_3O_4$ and $\gamma$-$Fe_2O_3$ particles can also be filtered out at the same high separating rates.

An even higher separating rate can be attained by having a filter structure rotate inside the working volume. A suitable device is partially indicated in transverse section in FIG. 6. The parts of this device not shown in the Figure correspond to those according to FIG. 5 or 1. The device contains, in a hollow cylindrical working volume, a squirrel cage rotor 32 which rotates about the axis 10 of the device and is caused to rotate by the rotating field generated in the working volume by the winding. Fastened to the outside of this squirrel cage is a helically wound roll of netting 33 which corotates in the working volume 34 of annular shape formed between the rotor 32 and the winding 6.

Figure 6:
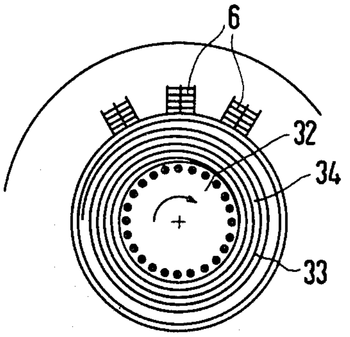

Instead of the squirrel cage rotor of the device according to FIG. 6, a motor outside of the working volume may also be provided to drive the roll of netting. Advantageously, it is possible with such a drive system to adjust the rotary speed of the filter structure independently of the rotary frequency of the magnetic field, in particular to keep it lower. If desired, a periodic change of the direction of rotation can also be accomplished in this manner.

Beyond this, a stack of individual round nets connected to the squirrel cage rotor 32 or to an external drive may also be provide the agitated filter structure instead of the roll of netting 33.

Figure 7:
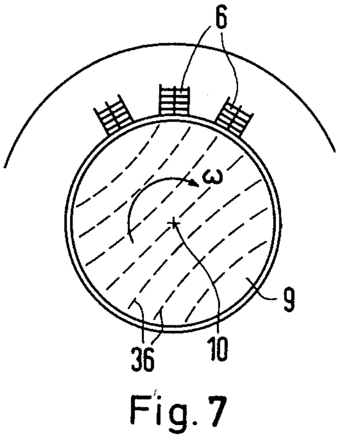
Figure 8:
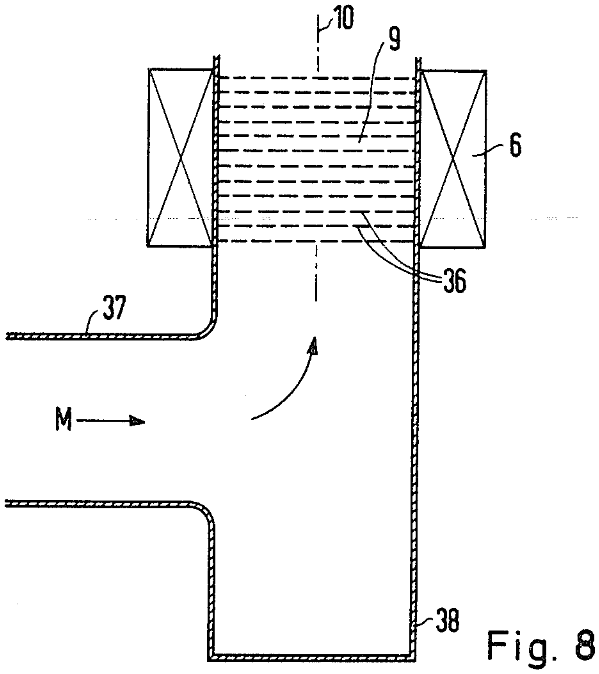

A device suitable for the separation of minute particles, particularly from a gaseous medium, is an embodiment of the device according to the present invention as shown in part in FIGS. 7 and 8 in transverse and longitudinal section, respectively. This device contains a cylindrical working volume 9 which is permeated by a rotating field and in which there are suspended ferromagnetic particles which are relatively large in comparison to the size of the particles to be separated, such as ferrite particles. These particles are kept within the magnetic field and string up along the field lines to form chains, of which only a few are shown as broken lines 36 in FIGS. 7 and 8. These chains thus form a netlike filter structure. Due to the rotating field brought about by the winding 6, clustered and, also, individual, particles of this filter structure revolve about their center of gravity at an angular velocity $\omega$. Now, if a gaseous medium carrying the particles to be separated is conducted through the working volume 9, these particles will first accumulate in the rotating field forming larger magnetizable structures which are then captured by the agitated net structure of ferromagnetic particles 9. The advantages of this embodiment of the device according to the present invention consist in particular in that it is particularly easy to clean because, when the rotating field is shut off, the ferromagnetic particles will drop out of the working volume due to the influence of gravity since magnetic forces previously exerted by the rotating field are now missing. As indicated in FIG. 8, the medium M carrying the particles to be separated may be conducted, for instance, from the side to the working volume 9 through a pipeline 37, this pipeline entering into the vertical direction of the rotating field axis 10 only directly below the working volume. The flow direction of the medium M is indicated by individual arrows in FIG. 8. In the downward extension of the rotating field axis 10 the pipeline 37 may become a catch basin 38 in which the ferromagnetic particles of the net structure and the particles separated by it settle when the rotary field is shut off.

Figure 9:
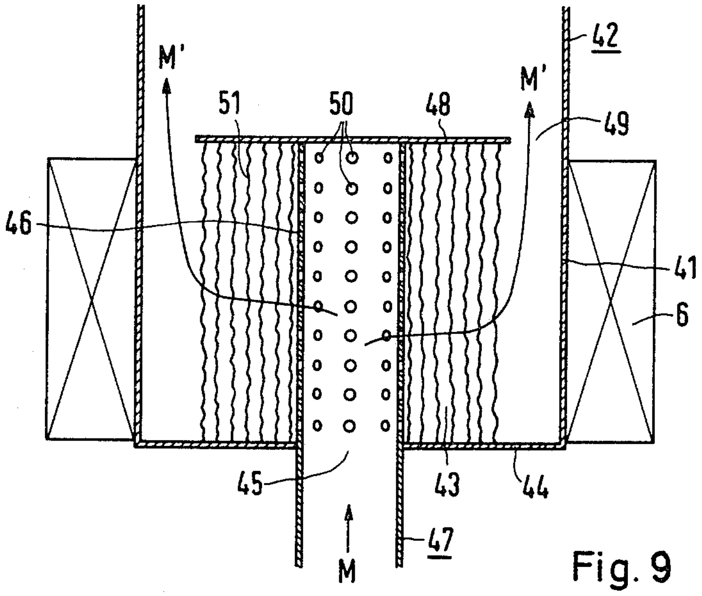

The premise on which the embodiments of a device for the separation of minute magnetizable particles according to FIGS. 5 to 8 are built is that the flow of the medium in which the particles to be separated are suspended is always perpendicular to the direction of the magnetic field and parallel to the magnet coil axis in the working volume. However, a radial flow in the direction of the magnetic field generated by the magnet coil may also be provided in the filter devices according to the present invention. Such an embodiment is depicted in longitudinal section in FIG. 9. The vertically mounted device contains a rotating field winding 6 which concentrically surrounds the lower end piece 41 of an upwardly open pipe 42 of nonmagnetic material. The end piece of this pipe, representing a working volume 43, is closed towards the bottom by a disc-shaped plate 44. This plate is provided with a central bore 45 through which the upper end piece 46 of another pipe 47 of nonmagnetic material is passed. This end piece 46 is tightly sealed on the top by a concentrically disposed, disc-shaped plate 48. The outside diameter of this plate is selected to be smaller than the inside diameter of the pipe 42 so that an annular gap 49 is formed between the plate and the pipe. Moreover, the end piece 46 of pipe 47 is provided with a multiplicity of holes 50 in the area of the working volume 43, distributed over its outside surface. It may just as well be designed as a tube of netting. More or less loosely wound around the end piece 46 is a winding 51 of a ferromagnetic wire net. Thus, the nets of winding 51 can oscillate with the frequency of the rotating field in the rotating field generated by the rotating field winding 6. As indicated by arrows in FIG. 9, a medium M with particles suspended in it is introduced into the device first in axial direction from below through the pipe 47, and then enters the working volume 43 through the holes 50 in the pipe end piece 46. Particularly due to the disc-shaped plate 48 lying in a radial plane, the medium is forced to flow in a radial direction and thus flows through the net winding 51, advantageiously perpendicular to the individual net layers. At the inside wall of the end piece 41 of pipe 42, to which the net winding 51 need not extend, the flow of the filtered medium, marked M', is again deflected into an axial direction and then enters the pipe 42 which carries it away through the gap 49.

The end piece 46 of pipe 47 may possibly also consist of ferromagnetic material and be a solid cylinder, for instance, provided with individual holes for the medium M to pass through. Through this measure it is possible to further increase the field strength in the working volume 43 and with it the field gradients on the wires of the net winding 51.

The embodiments according to FIGS. 1 to 9 are based on a rotating field generated by the stator winding of a three-phase motor. But a rotating field suitable for the device according to the invention can also be brought about by permanent magnets revolving around the working volume, or also by suitably dc-field magnet coils.

It is also assumed, in the illustrated embodiments, that the medium containing the particles to be separated is conducted through the working volume continuously at a predetermined flow velocity. However, an intermittent operation of the device is possible just as well. Therein, the medium is left for a predetermined period of time in the working volume formed by a vessel closed at the bottom, and is then discharged again. Subsequently, a new quantity of medium, determined by the working volume, can be introduced into the working volume. For instance, small amounts of suspensions, such as occur when testing blood in laboratories, can be examined by simple instruments without flow-through by separation into magnetizable and not magnetizable particles by means of suitable devices provided at the same time with a filter structure. Due to the accumulation of individual particles forming larger particle structures in the rotating field it is also possible to concentrate the magnetic contamination of a predetermined volume or flow to the point where a susceptibility measurement becomes possible. This permits monitoring contaminations, such as in power plant waters, continuously.

What is claimed is:

1. A device for the agglomeration of minute magnetizable particles down to particle sizes below 1 μm from a gaseous or liquid medium which includes a working volume permeated by a magnetic field, into which the medium is introduced in combination with a filtering system for the separation of said particles from said medium, comprising (a) a tubular member of non-magnetic material adapted to have said medium thereto;

(b) means surrounding a first portion of said member on its outside surface for generating a rotating field which is oriented at least approximately radially relative to the axis of the cylinder and which rotates around said axis, said first portion defining the working volume of said device said field causing an agglomeration of said minute particles to form larger structures; and (c) a filter system disposed in said tubular member downstream of the working volume for separating said larger structures from said medium.

2. A device according to claim 1, wherein said means for generating comprise a cylindrical stack of laminations with a central bore and a three-phase winding wound on said stack.

3. A device according to claim 1, wherein said device further includes at least one part of ferromagnetic material fixedly disposed in the working volume to obtain greater magnetic induction.

4. A device according to claim 3, comprising a ferromagnetic cylinder disposed in the working volume along the axis of rotation of the magnetic field.

5. A device for the agglomeration of minute magnetizable particles down to particle sizes below 1 μm from a gaseous or liquid medium which includes a working volume permeated by a magnetic field, into which the medium is introduced in combination with a filtering system for the separation of said particles from said medium, comprising (a) a tubular member of non-magnetic material adapted to have said medium fed thereto;

(b) means surrounding a first portion of said member on its outside surface for generating a rotating field which is oriented at least approximately radially relative to the axis of the cylinder and which rotates around said axis, said first portion defining the working volume of said device said field causing an agglomeration of said minute particles to form larger structures; and (c) a filter structure for the filtering system disposed in the working volume for separating said larger structures from said medium.

6. A device according to claim 5, wherein said filter structure is disposed in said working volume so as to be capable of being agitated.

7. A device according to claim 6, wherein said filter structure is disposed in said working volume for oscillation therein.

8. A device according to claim 7, wherein said filter structure comprises a wire net loosely wound around the axis of rotation of the rotating magnetic field or an axis at least parallel to said axis of rotation of the magnetic field.

9. A device according to claim 7, wherein said filter structure comprises: an end piece of an inner pipe which is provided with openings in the area of the working volume and is closed at one end face; and a wire net loosely wound around said end piece.

10. A device according to claim 9, wherein said end piece consists of ferromagnetic material.

11. A device according to claim 6, wherein said filter structure is supported for rotation.

12. A device according to claim 11, and further including a squirrel cage rotor supported for rotation in the working volume, said filter structure connected to said rotor.

13. A device according to claim 12, wherein said filter structure comprises a net loosely wound around said squirrel cage rotor.

14. A device according to claim 12, wherein said filter structure comprises a stack of round nets connected to said squirrel cage rotor.

15. A device according to claim 6, comprising a drive for the filter structure motion located outside of the working volume.

16. A device according to claim 6, wherein said filter structure comprises individual particles of ferromagnetic material accumulating in the direction of the field lines of the rotating magnetic field.

17. A device according to claim 6, wherein said rotating field is generated by the stator winding of a three-phase motor.

18. A device according to claim 6, wherein said rotating field is generated by permanent magnets revolving around the working volume.

19. A device according to claim 6, wherein said rotating field is generated by revolving dc-field magnet coils.

20. A device according to claim 5 wherein said means for generating comprise a cylindrical stack of laminations with a central bore and a three-phase winding wound on said stack.

21. A method of agglomerating minute magnetizable particles down to particle sizes below 1 $\mu$m from a gaseous and liquid medium and subsequently filtering larger structures formed by the agglomeration, comprising:

(a) establishing a closed working volume to which the gaseous or liquid medium can be fed;

(b) establishing a rotating magnetic field within the working volume;

(c) continuously conducting the medium including the particles suspended in it through the working volume at a predetermined flow velocity, whereby particles in the working volume will be magnetized and will be attracted to each other forming larger structures; and (d) feeding said gaseous or liquid medium with said larger structures therein through a filter system to filter out said larger structures.

22. A method of agglomerating magnetizable particles down to particle sizes below 1 $\mu$m from a gaseous or liquid medium and subsequently filtering larger structures formed by the agglomeration, comprising:

(a) establishing a closed working volume to which the gaseous or liquid medium can be fed;

(b) establishing a rotating magnetic field within the working volume;

(c) supplying said medium including the particles suspended therein to said working volume and retaining said medium therein for predetermined period of time whereby particles in the working volume will be magnetized and will be attracted to each other forming larger structures; and (d) then subsequently discharging said medium from said working volume and feeding said medium through a filter structure to filter out said larger structures.

* * * * *